US012572333B2

(12) United States Patent
Toriumi

(10) Patent No.: US 12,572,333 B2
(45) Date of Patent: Mar. 10, 2026

(54) VEHICLE ELECTRONIC CONTROL DEVICE AND PROGRAM REWRITING METHOD

(71) Applicant: Hitachi Astemo, Ltd., Hitachinaka (JP)

(72) Inventor: Fuhito Toriumi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 187 days.

(21) Appl. No.: 18/281,241

(22) PCT Filed: Mar. 4, 2022

(86) PCT No.: PCT/JP2022/009349

§ 371 (c)(1),
(2) Date: Sep. 8, 2023

(87) PCT Pub. No.: WO2022/215402

PCT Pub. Date: Oct. 13, 2022

(65) Prior Publication Data

US 2024/0160414 A1 May 16, 2024

(30) Foreign Application Priority Data

Apr. 8, 2021 (JP) ................................. 2021-065762

(51) Int. Cl.
*G06F 8/30* (2018.01)
*G07C 5/00* (2006.01)

(52) U.S. Cl.
CPC .............. *G06F 8/311* (2013.01); *G07C 5/008* (2013.01)

(58) Field of Classification Search
CPC .................................................. G06F 8/61–75
See application file for complete search history.

(56) References Cited

U.S. PATENT DOCUMENTS 10,649,759 B1 * 5/2020 Delange .................. G06F 11/07
2013/0061032 A1 * 3/2013 Suginaka .............. G06F 21/575
713/2

(Continued)

FOREIGN PATENT DOCUMENTS

JP 2005-284902 A 10/2005
JP 2008-3861 A 1/2008

(Continued)

OTHER PUBLICATIONS

International Search Report (PCT/ISA/210) issued in PCT Application No. PCT/JP2022/009349 dated May 24, 2022 with English translation (4 pages).

(Continued)

*Primary Examiner* — Duy Khuong T Nguyen
(74) *Attorney, Agent, or Firm* — Crowell & Moring LLP

(57) ABSTRACT

A nonvolatile memory of a vehicle electronic control device includes an activation program area that includes a startup program storage area, which is not subject to program rewriting, and a plurality of loader program areas, each of which stores a loader program, which is subject to program rewriting. The nonvolatile memory also includes a control program area that stores a control program which controls in-vehicle devices. When rewriting the activation program area in program rewriting in response to a program rewriting instruction from an external device, the processor rewrites the loader program in each of the plurality of loader program areas. When activating the vehicle electronic control device, the processor executes the loader program stored in a normal one of the plurality of loader program areas by using the startup program and activates the control program by using this loader program executed.

14 Claims, 6 Drawing Sheets

(56)                         References Cited

U.S. PATENT DOCUMENTS

| | | | | |
|---|---|---|---|---|
| 2014/0372742 | A1 * | 12/2014 | Hayakawa | ............. G06F 9/441 |
| | | | | 713/2 |
| 2021/0157529 | A1 * | 5/2021 | Sakurai | .............. B60W 60/001 |
| 2021/0165585 | A1 | 6/2021 | Harata et al. | |

FOREIGN PATENT DOCUMENTS

| | | |
|---|---|---|
| JP | 2018-136777 A | 8/2018 |
| JP | 2020-27668 A | 2/2020 |

OTHER PUBLICATIONS

Japanese-language Written Opinion (PCT/ISA/237) issued in PCT Application No. PCT/JP2022/009349 dated May 24, 2022 with English translation (8 pages).

International Preliminary Report on Patentability (PCT/IB/338 & PCT/IB/373) issued in PCT Application No. PCT/JP2022/009349 dated Oct. 19, 2023, including English translation of document C2 (Japanese-language Written Opinion (PCT/ISA/237), filed on Sep. 8, 2023) (13 pages).

* cited by examiner

FIG.7

| FAILURE OCCURRENCE TIMINGS | ADDITIONAL REWRITING TARGET LOADER PROGRAM AREAS | STATES |
|---|---|---|
| T1 | N/A | BEFORE START OF PROGRAM REWRITING |
| T2 | FIRST LOADER PROGRAM AREA | REWRITING FROM EXTERNAL DEVICE IS PERFORMED AGAIN TO ACTIVATE CONTROL PROGRAM AREA WITH SECOND LOADER PROGRAM STORED IN SECOND LOADER PROGRAM AREA NOT REWRITTEN YET |
| T3 | FIRST LOADER PROGRAM AREA | |
| T4 | FIRST LOADER PROGRAM AREA | |
| T5 | FIRST LOADER PROGRAM AREA | |
| T6 | FIRST LOADER PROGRAM AREA | |
| T7 | SECOND LOADER PROGRAM AREA | SINCE CONTROL PROGRAM AREA HAS NOT BEEN REWRITTEN YET, REWRITING FROM EXTERNAL DEVICE IS PERFORMED AGAIN |
| T8 | SECOND LOADER PROGRAM AREA | |
| T9 | SECOND LOADER PROGRAM AREA | SINCE ADDITIONAL REWRITING PROCESS REWRITES SECOND LOADER PROGRAM AREA BASED ON FIRST LOADER PROGRAM NORMALLY REWRITTEN, NO NEED TO REWRITE SECOND LOADER PROGRAM AREA FROM EXTERNAL DEVICE AGAIN |
| T10 | SECOND LOADER PROGRAM AREA | |
| T11 | SECOND LOADER PROGRAM AREA | |
| T12 | SECOND LOADER PROGRAM AREA | |
| T13 | N/A | REWRITING PROCESS HAS BEEN COMPLETED NORMALLY |

VEHICLE ELECTRONIC CONTROL DEVICE AND PROGRAM REWRITING METHOD

TECHNICAL FIELD

The present invention relates to a vehicle electronic control device and a program rewriting method.

BACKGROUND ART

The version of a program that operates on an electronic control unit (ECU) mounted in a vehicle such as an automobile may need to be rewritten to a newer version, for example, to change ECU functions or to correct defects or fix problems. As an example of the technique relating to the rewriting of an ECU program, there has been proposed a technique in which an electronic control unit includes a nonvolatile memory including a first data storage area and a second data storage area, and rewrites a program on the second data storage area based on update data received from a vehicle master device. When an activation execution condition is satisfied, the electronic control unit activates the second data storage area as an activation area based on operation area information indicating one of the first data storage area and the second data storage area as an operation area.

REFERENCE DOCUMENT LIST

Patent Document

Patent Document 1: JP 2020-27668A

SUMMARY OF THE INVENTION

Problem to be Solved by the Invention

A nonvolatile memory that stores the programs that operate on an ECU mainly includes an activation program area that stores an activation program that operates when the ECU is activated, and includes a control program area that realizes, for example, the control of in-vehicle devices by the ECU. For example, if a communication failure or shutdown of a power supply occurs during the program rewriting as described above, the rewriting results in a failure, and as a result, an abnormality may occur in these program areas. The abnormality may also occur due to physical factors such as loss of the charge in a storage element of the nonvolatile memory due to deterioration over time. In particular, if such an abnormality occurs in the activation program area, activation of the ECU may result in failure.

In one aspect, an object of the present invention is to reduce the risk that activation of an ECU results in failure and to improve the reliability of the operation of the ECU.

Means for Solving the Problem

In one aspect of the present invention, an ECU includes a nonvolatile memory in which data is electrically rewritable, and a processor. The nonvolatile memory includes: an activation program area that includes a startup program area which stores a startup program, which is not subject to program rewriting, and a plurality of loader program areas, each of which stores a loader program, which is subject to program rewriting; and a control program area that stores a control program which controls in-vehicle devices. When rewriting the loader programs in program rewriting in response to a program rewriting instruction from an external device, the processor rewrites the loader program in one of the plurality of loader program areas. If the rewritten data in this loader program area is normal, the processor rewrites the loader program in another one of the loader program areas. When activating the ECU, the processor executes the loader program stored in a normal one of the plurality of loader program areas by using the startup program and activates the control program by using this loader program executed.

Effects of the Invention

The present invention reduces the risk that activation of an ECU results in failure and improves the reliability of the operation of the ECU.

BRIEF DESCRIPTION OF THE DRAWINGS

FIG. 7 illustrates a relationship between abnormality occurrence timings during the program rewriting process according to the example of the present invention and ECU operations corresponding to the timings.

MODE FOR CARRYING OUT THE INVENTION

Figure 1:
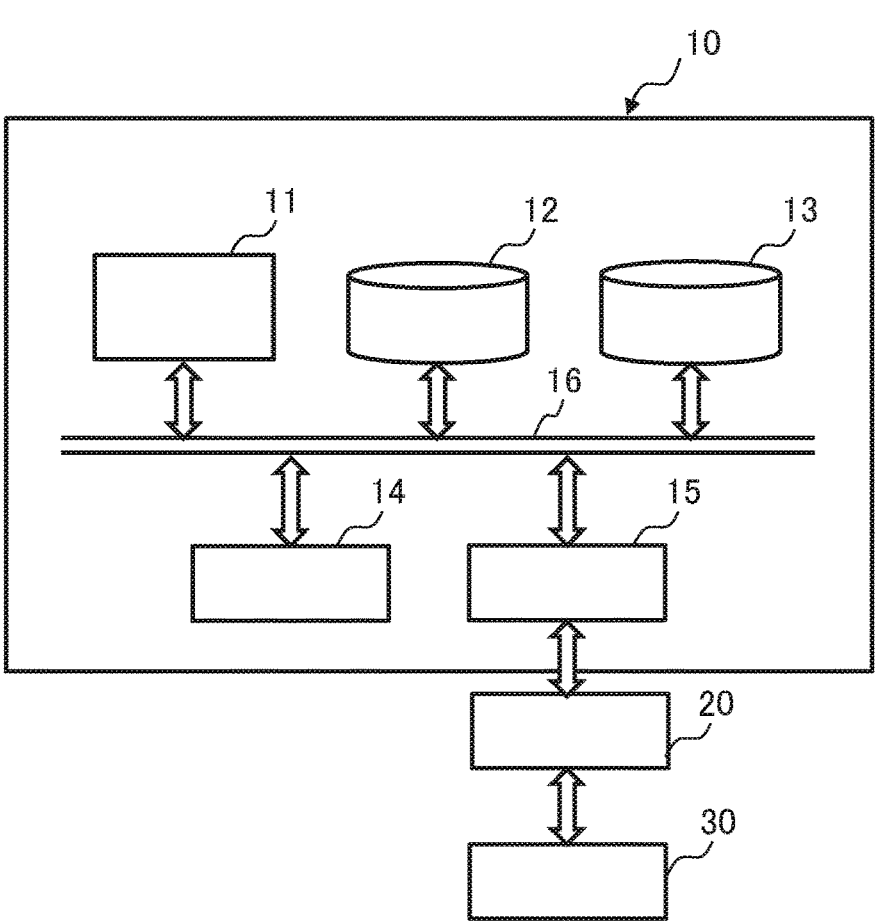
FIG. 1 is a block diagram illustrating an example of an ECU according to an example of the present invention.

Hereinafter, a specific example of the present invention will be described in detail with reference to the accompanying drawings. In some of the drawings, components are denoted by reference numerals only, without names.

FIG. 1 illustrates an example of an electronic control unit (ECU) 10 mounted in a vehicle such as an automobile. ECU 10 is a microcontroller that electronically controls in-vehicle devices (for example, a fuel injection valve, a spark plug, an automatic transmission, a brushless motor, etc.). As illustrated in FIG. 1, ECU 10 includes a processor 11, a RAM 12, a ROM 13, an input/output interface 14, a communication interface 15, and an internal bus 16 that connects these components such that these components can communicate with each other.

Processor 11 is a hardware component that executes a set of instructions (data transfer, calculation, process, control, management, etc.,) written in a program, and is constituted by an arithmetic unit, a register that stores instructions and information, a peripheral circuit, etc. Processor 11 loads a program stored in ROM 13 into RAM 12 and executes the program.

RAM 12 is a volatile memory in which data is erased when power is shut down, and provides a temporary storage area used by processor 11 during operation.

ROM 13 is an electrically rewritable nonvolatile memory and is, for example, a flash ROM and an EEPROM. ROM 13 stores an activation program that operates when ECU 10 is activated, a control program that controls the in-vehicle devices, and data such as parameters used for the processing of these programs.

Input/output interface 14 includes an A/D converter, a D/A converter, a D/D converter, etc., and provides input and output functions for analog signals and digital signals from and to an external device. Communication interface 15 includes, for example, a controller area network (CAN) transceiver and provides a function of connecting to an in-vehicle network. Internal bus 16 is a path that various devices use to exchange data with each other, and includes an address bus for transferring addresses, a data bus for transferring data, and a control bus for transmitting timings at which input and output are actually performed through the address bus and the data bus and for transmitting control information.

Communication interface 15 of ECU 10 is connected to a wireless communication device 30 that wirelessly communicates with an OTA (Over-the-Air) base station via a gateway 20. Gateway 20 converts the protocol of data transmitted from the OTA base station into a protocol that can be processed by communication interface 15, and also converts the protocol of data processed by ECU 10 into a protocol that can be processed by the OTA base station.

In the present example, when a program that operates in ECU 10 needs to be updated, the OTA base station delivers a new version of the program to the vehicle by wireless communication, and wireless communication device 30 of the vehicle receives the new version of the program. Gateway 20 converts the protocol of this program and transmits the converted program to ECU 10. Next, the program stored in ROM 13 inside ECU 10 is rewritten with the new version of the program. The program of ECU 10 may also be rewritten by connecting an external program rewriting device via a connector mounted in the vehicle. When ECU 10 is activated after the program has been rewritten, the program of the new version is executed.

Figure 2:
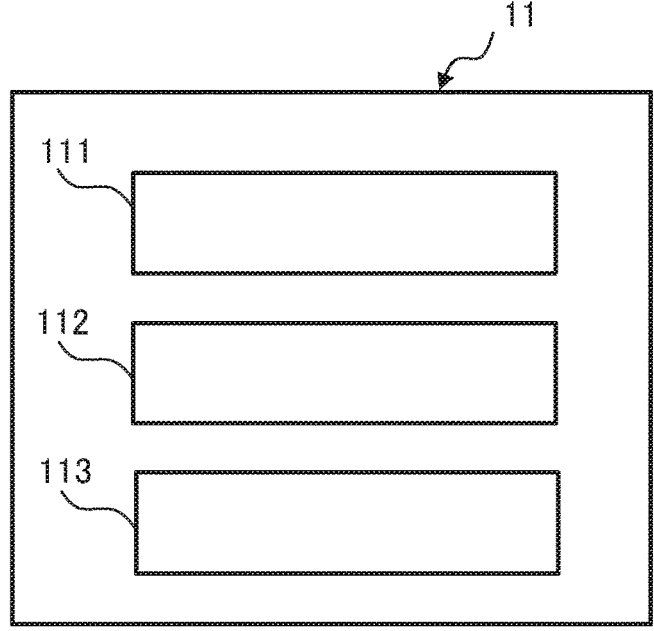
FIG. 2 is a block diagram illustrating an example of functions implemented by a processor of the ECU according to the example of the present invention.

FIG. 2 is a block diagram illustrating functions implemented by processor 11 of ECU 10. Processor 11 includes a program rewriting unit 111 and a control execution unit 112 that are each implemented by executing a program.

Program rewriting unit 111 rewrites a program stored in ROM 13 of ECU 10 in response to a program rewriting instruction from an external device.

Control execution unit 112 executes the activation program stored in ROM 13 to activate ECU 10 and executes the control program to perform electronic control on the in-vehicle devices.

An additional program rewriting unit 113 performs an additional program rewriting process when there is an abnormality in a program area stored in ROM 13.

Next, data areas in ROM 13 of ECU 10 will be described.

Figure 3:
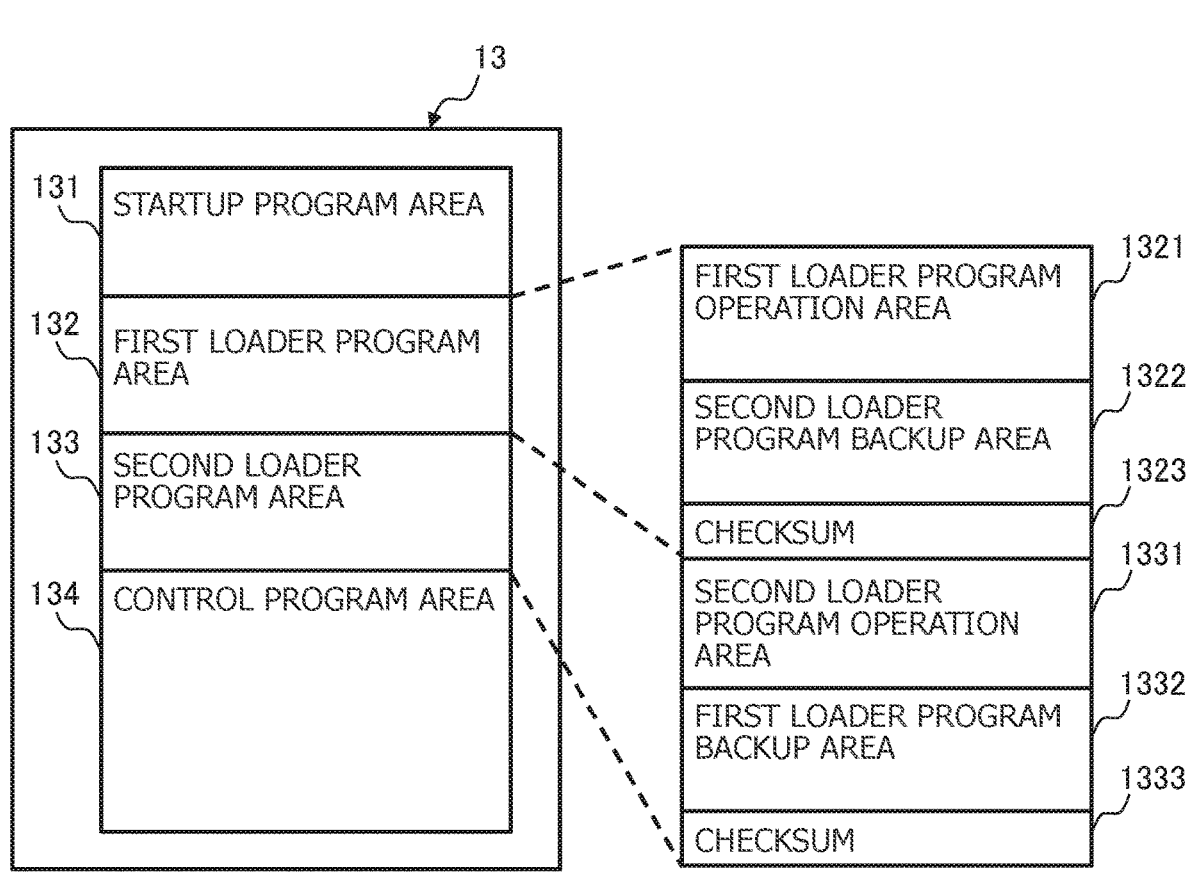
FIG. 3 illustrates an example of program storage areas in a ROM of the ECU according to the example of the present invention.

FIG. 3 illustrates an example of program storage areas in ROM 13. The program storage areas in ROM 13 include a startup program area 131, a first loader program area 132, and a second loader program area 133, which are included in an activation program area, and a control program area 134.

Startup program area 131 stores a startup program, which is one of the activation programs of ECU 10 and controls various resident programs when ECU 10 is activated. Startup program area 131 will not be rewritten.

First loader program area 132 and second loader program area 133 each store a loader program, which is one of the activation programs of ECU 10 and loads and activates the control program. The loader program is invoked and executed by the above-described startup program.

First loader program area 132 includes a first loader program operation area 1321, a second loader program backup area 1322, and a checksum 1323. First loader program operation area 1321 stores a loader program to be operated. Second loader program backup area 1322 stores a copy of the loader program stored in second loader program area 133. Checksum 1323 is used for checking whether first loader program area 1321 is normal. Similarly, second loader program area 133 includes a second loader program operation area 1331, a first loader program backup area 1332, and a checksum 1333. Second loader program operation area 1331 stores a loader program to be operated. First loader program backup area 1332 stores a copy of the loader program stored in first loader program area 132. Checksum 1333 is used for checking whether second loader program operation area 1331 is normal.

Control program area 134 stores the control program for the electronic control performed by ECU 10 on the in-vehicle devices. Control program area 134 may include data such as parameters used for the processing of the control program. The control program is loaded by the above-described loader program, and is executed by processor 11, to realize the electronic control.

That is, if ECU 10 normally operates, processor 11 executes the startup program, the loader program, and the control program, in this order.

Figure 4:
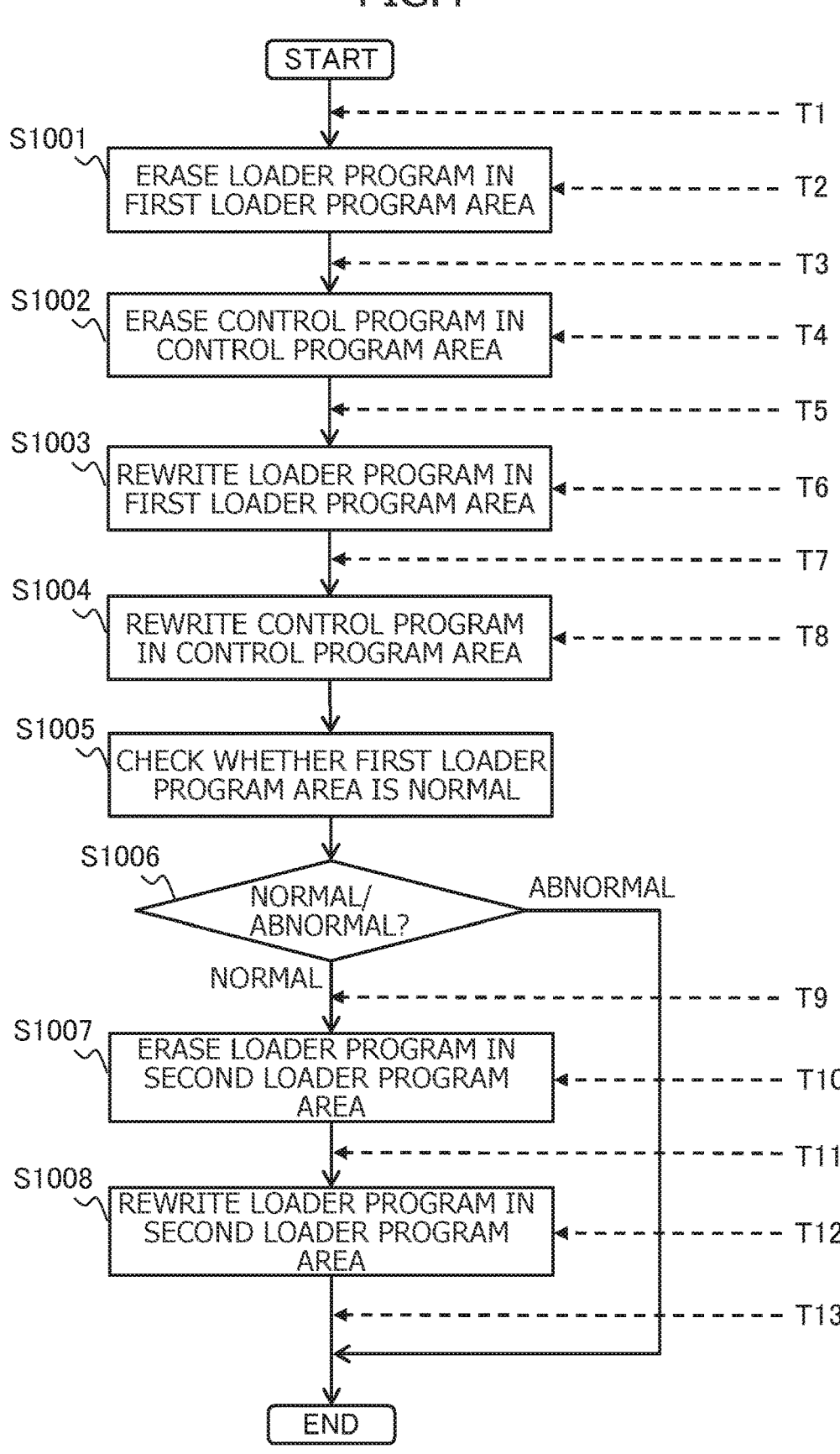
FIG. 4 is a flowchart illustrating an example of a program rewriting process according to the example of the present invention.

FIG. 4 illustrates an example of a program rewriting process in which processor 11 rewrites a program stored in ROM 13 in response to a program rewriting instruction from an external device. The program rewriting instruction from the external device is, for example, a rewriting instruction from the OTA or a rewriting instruction from an external program rewriting device connected to ECU 10. In the program rewriting process, processor 11 rewrites all the program areas in ROM 13 illustrated in FIG. 3, except for startup program area 131. The function of program rewriting unit 111 is implemented by this program rewriting process.

In step 1001 (indicated as S1001 in FIG. 4, and the following step numbers will also be indicated in this way, processor 11 erases the loader program in first loader program area 132.

In step 1002, processor 11 erases the control program in control program area 134.

In step 1003, processor 11 rewrites the loader program in first loader program area 132 with a loader program included in a program rewriting instruction from the external device. More specifically, processor 11 rewrites the data of first loader program operation area 1321, second loader program backup area 1322, and checksum 1323 of first loader program area 132.

In step 1004, processor 11 rewrites the control program in control program area 134 with a control program included in the program rewriting instruction from the external device. Although not illustrated, processor 11 also writes a checksum in control program area 134.

In step 1005, processor 11 checks whether the data of first loader program area 132 written in step 1003 is normal. More specifically, processor 11 checks whether the data of first loader program operation area 1321 and second loader program backup area 1322 is normal by using checksum 1323.

In step 1006, if processor 11 determines that the check result obtained in step 1005 is normal, the process proceeds to step 1007. If processor 11 determines that the check result is abnormal, processor 11 ends the process as it is. Alternatively, if processor 11 determines that the check result is abnormal, processor 11 may notify the external device that the rewriting of the program in first loader program area 132 has failed.

In step 1007, processor 11 erases the loader program in second loader program area 133.

In step 1008, processor 11 rewrites the loader program in second loader program area 133 with the loader program in first loader program area 132. More specifically, processor 11 rewrites the data of second loader program operation area 1331, first loader program backup area 1332, and checksum 1333 of second loader program area 133. Alternatively, as in step 1003, the loader program included in the program rewriting instruction from the external device may be directly written in second loader program area 133, instead of using the copy from first loader program area 132.

Figure 5:
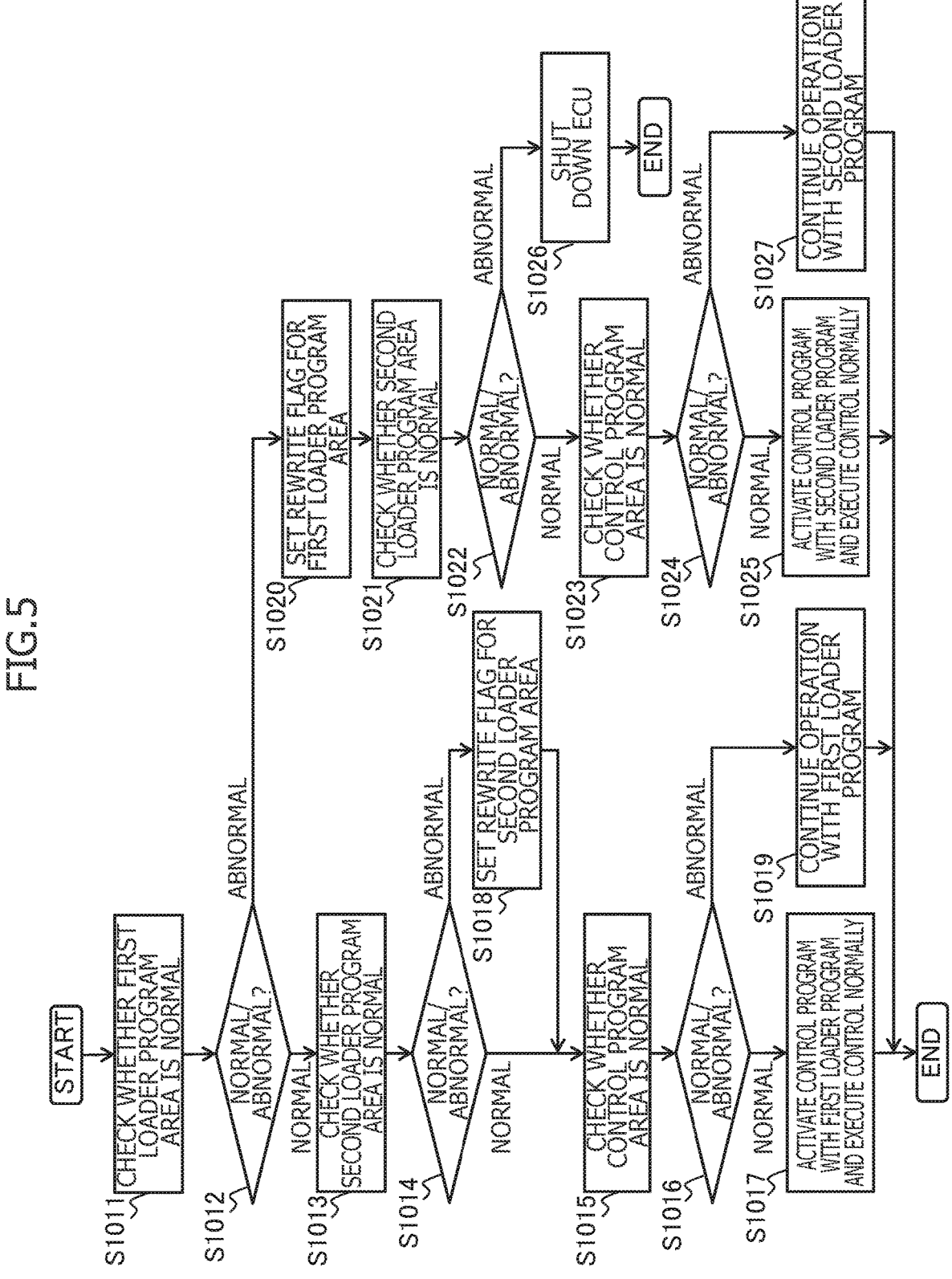
FIG. 5 is a flowchart illustrating an example of an ECU activation process according to the example of the present invention.

FIG. 5 illustrates an example of a process of activating ECU 10 and realizing the electronic control performed by ECU 10 on the in-vehicle devices. In this process, first, processor 11 executes the startup program stored in startup program area 131, among the programs stored in the program storage areas in ROM 13 illustrated in FIG. 3. The function of control execution unit 112 is realized by this process.

In step 1011, by performing the processing of the startup program, processor 11 checks whether the loader program in first loader program area 132 is normal. More specifically, processor 11 checks whether the data of first loader program operation area 1321 and second loader program backup area 1322 is normal by using checksum 1323.

In step 1012, if processor 11 determines that the check result obtained in step 1011 is normal, the process proceeds to step 1013. If processor 11 determines that the check result is abnormal, the process proceeds to step 1020.

In step 1013, by performing the processing of the startup program, processor 11 checks whether the loader program in second loader program area 133 is normal. More specifically, processor 11 checks whether the data of second loader program operation area 1331 and first loader program backup area 1332 is normal by using checksum 1333. In this step, it is desirable that processor 11 check whether the loader program in second loader program operation area 1331 matches the loader program in first loader program operation area 1321.

In step 1014, if processor 11 determines that the check result obtained in step 1013 is normal, the process proceeds to step 1015. If processor 11 determines that the check result is abnormal, the process proceeds to step 1018.

In step 1015, by performing the processing of the loader program stored in first loader program area 132, which has been determined to be normal, processor 11 checks whether the control program stored in control program area 134 is normal. Processor 11 can also perform this checking by using the checksum (not illustrated) in control program area 134.

In step 1016, if processor 11 determines that the check result obtained in step 1015 is normal, the process proceeds to step 1017. If processor 11 determines that the check result is abnormal, the process proceeds to step 1019.

In step 1017, by performing the processing of the loader program stored in first loader program area 132, which has been determined to be normal, processor 11 loads the control program stored in control program area 134 and activates and executes the control program. Thus, the electronic control performed by ECU 10 on the in-vehicle devices is realized.

If all of first loader program area 132, second loader program area 133, and control program area 134 are normal, the process proceeds from step 1011 to step 1017.

Next, a case in which an abnormality is detected in the checking of second loader program area 133 in step 1013 will be described. As described above, if processor 11 determines that the check result is abnormal in step 1014, the process proceeds to step 1018.

In step 1018, processor 11 sets a rewrite flag for second loader program area 133. Accordingly, an additional rewriting process is preferentially performed on second loader program area 133 by the additional program rewriting process, which will be described below. Next, the process proceeds to step 1015.

Next, a case in which an abnormality is detected in the checking of control program area 134 in step 1015 will be described. As described above, if processor 11 determines that the check result is abnormal in step 1016, the process proceeds to step 1019.

In step 1019, by performing the processing of the loader program stored in first loader program area 132, which has been determined to be normal, processor 11 continues the operation of ECU 10. In this case, since there is an abnormality in control program area 134, the electronic control performed by ECU 10 cannot be realized at this point. However, processor 11 can continue the operation of ECU 10 with the loader program, and it can properly wait for another program rewriting instruction from the external device. In this step, if a rewrite flag has been set for second loader program area 133 in step 1018, second loader program area 133 can be preferentially rewritten by the additional program rewriting process, which will be described below.

If the loader program in second loader program area 133 has also been determined to be normal, the process may be performed by using any one of the loader programs in first loader program area 132 and second loader program area 133 in step 1017 or 1019.

Next, a case in which an abnormality is detected in the checking of first loader program area 132 in step 1011 will be described. As described above, if processor 11 determines that the check result is abnormal in step 1012, the process proceeds to step 1020.

In step 1020, processor 11 sets a rewrite flag for first loader program area 132. Accordingly, first loader program area 132 is preferentially rewritten by the additional program rewriting process, which will be described below.

In step 1021, by performing the processing of the startup program, processor 11 checks whether the loader program in second loader program area 133 is normal. More specifically, processor 11 checks whether the data of second loader program operation area 1331 and first loader program backup area 1332 is normal by using checksum 1333.

In step 1022, if processor 11 determines that the check result obtained in step 1021 is normal, the process proceeds to step 1023. If processor 11 determines that the check result is abnormal, the process proceeds to step 1026.

In step 1023, by performing the processing of the loader program stored in second loader program area 133, which has been determined to be normal, processor 11 checks whether the control program in control program area 134 is normal. As in step 1015, processor 11 can also perform this checking by using the checksum (not illustrated) in control program area 134.

In step 1024, if processor 11 determines that the check result obtained in step 1023 is normal, the process proceeds to step 1025. If processor 11 determines that the check result is abnormal, the process proceeds to step 1027.

In step 1025, by performing the processing of the loader program stored in second loader program area 133, which has been determined to be normal, processor 11 loads the control program stored in control program area 134 and activates and executes the control program. In this way, the electronic control by ECU 10 on the in-vehicle devices is realized.

Next, a case in which an abnormality is detected in the checking of second loader program area 133 in step 1021 will be described. As described above, if processor 11 determines that the check result is abnormal in step 1022, the process proceeds to step 1026.

In step 1026, since both of first loader program area 132 and second loader program area 133 are abnormal, processor 11 shuts down ECU 10 in view of safety.

Next, a case in which an abnormality is detected in the checking of control program area 134 in step 1023 will be described. As described above, if processor 11 determines that the check result is abnormal in step 1024, the process proceeds to step 1027.

In step 1027, by performing the processing of the loader program stored in second loader program area 133, which has been determined to be normal, processor 11 continues the operation of ECU 10. In this case, as in step 1019, since there is an abnormality in control program area 134, the electronic control performed by ECU 10 cannot be realized at this point. However, processor 11 can continue the operation of ECU 10 with the loader program and can wait for another normal program rewriting process. In this case, since a rewrite flag has been set for first loader program area 132 in step 1202, processor 11 can preferentially perform the additional program rewriting process, which will be described below, on first loader program area 132.

Figure 6:
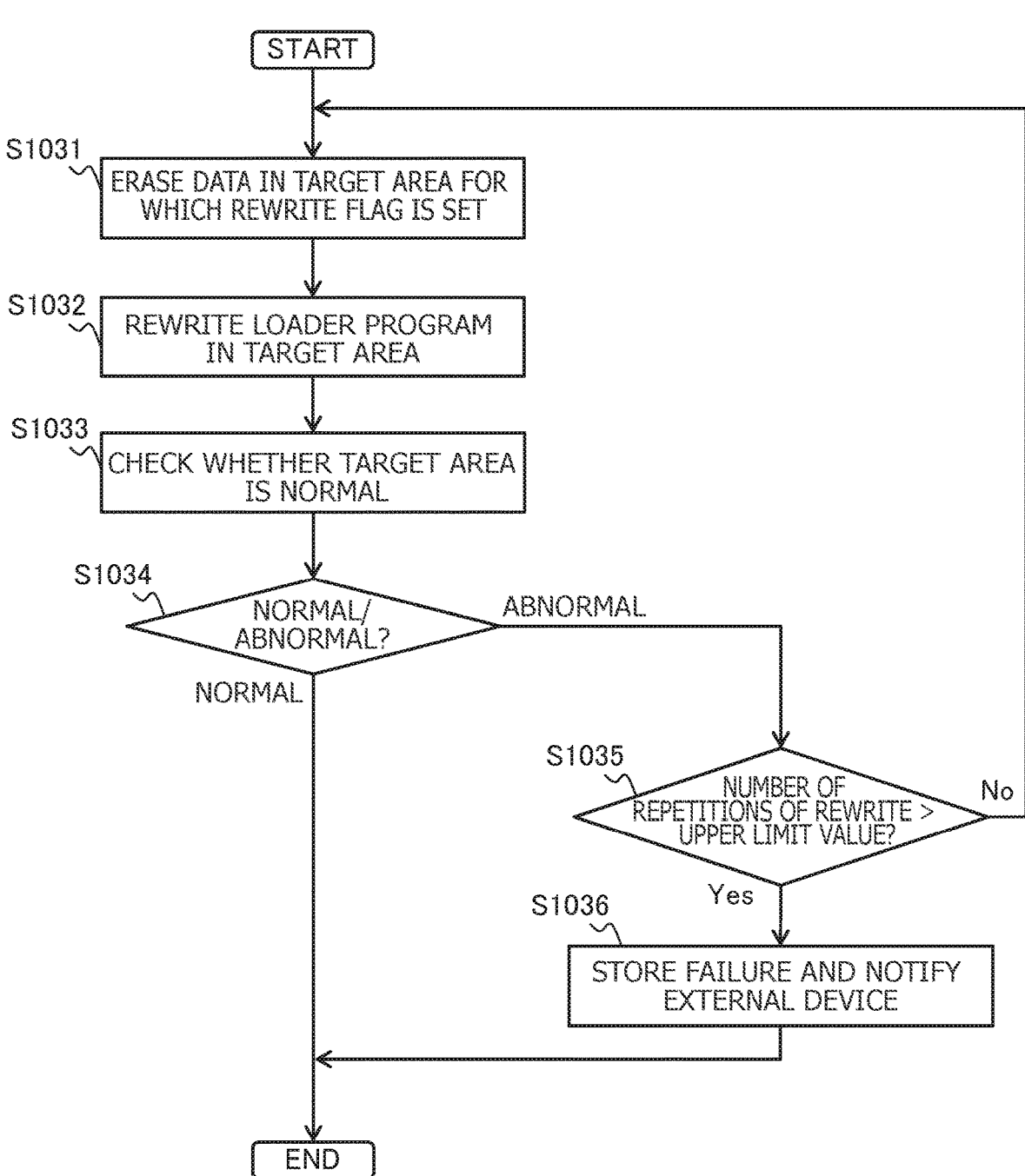
FIG. 6 is a flowchart illustrating an example of an additional program rewriting process according to the example of the present invention.

FIG. 6 illustrates an example of the additional program rewriting process performed when an abnormality is detected in first loader program area 132 or second loader program area 133. When a rewrite flag has been set for any one of the areas, this process is performed at a predetermined timing (for example, immediately after the program rewriting process or after a predetermined time has elapsed).

In step 1031, processor 11 sets a loader program area for which a rewrite flag is set as an additional rewriting target area and erases the loader program in the additional rewriting target area.

In step 1032, processor 11 rewrites the loader program in the additional rewriting target area with the loader program written in a normal loader program area. That is, when a rewrite flag is set for first loader program area 132, processor 11 copies the loader program stored in second loader program 133 and writes the copied loader program in first loader program area 132. More specifically, processor 11 copies the data of second loader program operation area 1331, first loader program backup area 1332, and checksum 1333 and writes the copied data in first loader program operation area 1321, second loader program backup area 1322, and checksum 1323 of first loader program area 132, respectively. When a rewrite flag is set for second loader program area 133, processor 11 copies the loader program stored in first loader program 132 and writes the copied loader program in second loader program area 133. More specifically, processor 11 copies the data of first loader program operation area 1321, second loader program backup area 1322, and checksum 1323 and writes the copied data in second loader program operation area 1331, first loader program backup area 1332, and checksum 1333 of second loader program area 133, respectively.

In step 1033, processor 11 checks whether the loader program in the additional rewriting target area is normal.

In step 1034, if processor 11 determines that the check result obtained in step 1033 is normal, processor 11 ends the process. If processor 11 determines that the check result is abnormal, the process proceeds to step 1035.

In step 1035, processor 11 determines whether the number of repetitions of the rewriting process exceeds an upper limit value, which is a predetermined threshold. If processor 11 determines that the number of repetitions exceeds the upper limit value (Yes in step 1035), the process proceeds to step 1036. If processor 11 determines that the number of repetitions does not exceed the upper limit value (No in step 1035), processor 11 increments the counter of the number of repetitions by one, and the process returns to step 1031.

In step 1036, processor 11 stores information indicating that a failure has occurred in the additional rewriting target area and notifies the external device of the information. As a specific example, a warning may be output by an output means such as a warning lamp mounted in a vehicle, and an external server or the like may be notified of the failure via wireless communication. In this case, since the electronic control performed by ECU 10 can be normally performed by the loader program stored in the above-described normal loader program area, there is no need to limit the processing of ECU 10.

Next, a relationship between failure occurrence timings during the program rewriting process performed in response to a program rewriting instruction from an external device and corresponding operations of ECU 10 will be described. FIG. 7 is a table illustrating: timings T1 to T13 at which a failure may occur during the program rewriting process illustrated in FIG. 4 according to the present example; loader program areas, which could be additional program rewriting targets when a failure occurs at their respective timings, and corresponding operations of ECU 10. Examples of the cause of a failure during the program rewriting process may include shutdown of the power supply to ECU 10 and a failure of the communication with the OTA.

T1 is a timing before the program rewriting is started. When a failure occurs at this timing, the operation can be performed by the loader program and the control program, which have not been rewritten yet. In this case, since none of the program areas have been rewritten, another program rewriting process is performed by the external device.

T2 to T6 are between a timing at which erasing of the data in first loader program area 132 is started and a timing before rewriting of first loader program area 132 is completed. If a failure occurs at timing T2 or T3, control program area 134 can be activated by the loader program in second loader program area 133, which has not been rewritten yet. In this case, a rewrite flag is set for first loader program area 132, and the additional rewriting process is preferentially performed on first loader program area 132. However, since neither second loader program area 133 nor control program area 134 has been rewritten yet, another program rewriting process from the external device is performed. In addition, even when a failure occurs at any of timings T4 to T6, ECU 10 can be activated by the loader program in second loader program area 133, which has not been rewritten yet. In this case, a rewrite flag is set for first loader program area 132, and the additional rewriting process is preferentially performed on first loader program area 132. However, since second loader program area 133 has not been rewritten yet and control program area 134 has been erased, another program rewriting process from the external device is performed.

At either timing T7 or T8, although the rewriting of the loader program in first loader program area 132 has already been completed, the rewriting of control program area 134 is not yet completed. If a failure occurs at timing T7 or T8, ECU 10 can be operated by the load program in first loader program area 132, which has been rewritten. At this timing, both of first loader program area 132 and second loader program area 133 are not in the middle of the rewriting process but are in a normal state. However, because second loader program area 133 has not been rewritten yet, the data in first loader program area 132 and the date in second loader program area 133 do not match. Thus, a rewrite flag is set for second loader program area 133, and the additional program rewriting process is preferentially performed on second loader program area 133. In this case, however, since control program area 134 has not been written yet, another program rewriting process from the external device is performed.

T9 to T12 are timings after first loader program area 132 and control program area 134 have been written, after erasing of second loader program area 133 is started, and before rewriting of second loader program area 133 is completed. If a failure occurs at any one of timings T9 to T12, a rewrite flag is set for second loader program area 133, and the additional program rewriting process is preferentially performed on second loader program area 133. At any one of timings T9 to T12, the program in second loader program area 133 can be rewritten by using the loader program in first loader program area 132, which has already been written by the additional program rewriting process. Thus, another program rewriting process does not need to be performed by the external device.

At timing T13, since all the program rewriting processes have been completed, even if a failure occurs at this timing, another program rewriting processing does not need to be performed.

As described above, according to the present example, even if a failure occurs at any timing during the program rewriting process performed by the external device, ECU 10 can be operated by the loader program stored in one of the loader program areas.

According to the present example described above, ROM 13 of ECU 10 redundantly includes first loader program area 132 and second loader program area 133, each of which serves as a loader program area that stores a loader program, which is subject to program rewriting among the activation programs. When processor 11 performs the program rewriting in response to a program rewriting instruction from the external device, processor 11 rewrites the activation program area, specifically, rewrites the loader programs in both of first loader program area 132 and second loader program area 133. When processor 11 activates ECU 10, the loader program stored in a normal one of first loader program area 132 and second loader program area 133 is executed by the startup program, and the control program is activated by this loader program executed.

For example, according to the present example, even when an abnormality occurs in first loader program area 132, the control program can be loaded and activated by the loader program stored in second loader program area 133. In addition, even when an abnormality occurs in second loader program area 133, the control program can be loaded and activated by the loader program stored in first loader program area 132.

As a result, according to the present example, even when an abnormality occurs in the activation program area due to the program rewriting process, the control by ECU 10 can be performed by the loader program stored in one of the loader program areas. Thus, the reliability of the operation of ECU 10 can be improved.

In particular, recent years have seen occurrence of unauthorized program rewriting that misuses the OTA, and security enhancement may be needed for the ECUs of the vehicles that are already on the market. In this case, not only the control programs, but also the activation programs may need to be rewritten. In addition, in another aspect, development centers using OEM (original equipment manufacturing) for vehicles are spreading worldwide, and specifications are becoming more complicated. As a result, there are increasing instances in which, during the development of an ECU, activation programs in a ROM need to be rewritten due to specification changes. In this respect, according to the present example, the activation program area in ECU 10 is divided into a storage area for the startup program, which is a basic part not affected by a change in specifications or the like, and storage areas for loader programs, which can be rewritten in accordance with a change in specifications or the like. These storage areas for the loader programs, which are subject to the program rewriting process, are redundantly provided. Therefore, the impact on the operation of ECU 10, the impact being possibly caused by an abnormality in ROM 13 due to the rewriting of the activation program, can be effectively reduced.

In addition, an abnormality in the activation program area in the ROM is not limited to an abnormality caused due to the program rewriting process. An abnormality could be caused by a physical factor, such as loss of the charge in a storage element of the nonvolatile memory due to deterioration over time. According to the present example, even when an abnormality occurs in one of the loader program areas due to these other factors, the loader program stored in the other loader program area can be executed and the control by the ECU10 can be performed.

In addition, even when an abnormality occurs in control program area 134, since one of the loader programs can operate as described above, the operation of ECU 10 is continued, and ECU 10 can properly wait for another program rewriting process in response to a program rewriting instruction from the external device.

Furthermore, according to the present example, first, the loader program in first loader program area 132 is rewritten, and when it is determined that the rewritten loader program in first loader program area 132 is normal, the loader program in second loader program area 133, which is the other loader program area, is rewritten. Thus, the reliability of the data in the loader program areas having a redundant configuration is improved.

In addition, according to the present example, when an abnormality occurs in any of the loader program areas, this loader program area is set as an additional rewriting target area, and the loader program in the additional rewriting target area can be rewritten with the loader program in the normal loader program area by the additional program rewriting process. In this way, another program rewriting process does not need to be performed from the external device, and a redundant configuration of loader program areas can be created.

Furthermore, according to the present example, in the additional program rewriting process, when the upper limit value of the number of repetitions of the additional rewriting process performed on the additional rewriting target area is exceeded, information indicating that a failure has occurred in the additional rewriting target area is stored in ROM 13 or external storage means, and the external device is notified that the target area is abnormal. In this way, the physical failure or the like of a storage element in ROM 13 can be quickly managed. If necessary, the external device may be notified of prohibition of the use of this additional rewriting target area.

Next, a modification of the additional program rewriting process will be described. In this modification, even when the additional rewriting target area is determined as being normal in step 1033 in FIG. 6, for example, the timing of the execution of the additional rewriting process may be stored together with the information about the additional rewriting target area. In this case, the frequency of the execution of the additional rewriting process may be calculated per loader program area. When the frequency of the execution of the additional rewriting process performed on a loader program area is higher than a predetermined threshold, a warning may be output to the external device. In addition, when the frequency is particularly high, information indicating that a failure may have occurred in the target area may be stored in ROM 13 or external storage means. The external device may be notified of this information.

As another modification, when ECU 10 is activated next time, the loader program stored in the loader program area on which the additional rewriting process has been performed at the lowest frequency may be executed. In this way, the reliability of the activation of ECU 10 can be further improved.

Note that the additional program rewriting process is not essential to the present invention but is an optional process.

In the present example, first loader program area 132 includes second loader program backup area 1322, and second loader program area 133 includes first loader program backup area 1332. By providing such an additional redundant configuration, the risk that the loader program cannot be executed can be further reduced. The presence of such backup areas is not essential to the present invention and is an optional configuration.

Furthermore, as another modification, the program rewriting process in response to a program rewriting instruction from the external device may be performed only when at least two of the plurality of loader program areas are normal. That is, in the case of the present example, the program rewriting process may be performed only when both of first loader program area 132 and second loader program area 133 are normal. In this way, the program rewriting is performed only when a redundant configuration of loader program areas can be realized without fail. Thus, the reliability of the operation of ECU 10 can be further improved.

As a modification of the program areas, a plurality of control program areas may be redundantly provided in ROM 13. When ECU 10 is activated, the control program stored in a normal one of the plurality of control program areas may be selected and activated. In addition, when an abnormality occurs in any one of the control program areas, a rewrite flag may be set for this abnormal control program area. In the additional program rewriting process, the control program of the abnormal control program area may be rewritten with the control program in another control program storage area. As a result, even when an abnormality occurs in any one of the control program areas, the control by ECU 10 can be normally performed. In addition, it is more likely that another execution of the program rewriting process from the external device will be prevented.

In the present example, a redundant configuration of two loader program areas, that is, first loader program area 132 and second loader program area 133, is formed. However, the number of areas is not limited to two. Three or more areas may be provided to form a redundant configuration. The same applies to the case in which a redundant configuration of control program areas is formed.

In the present example described above, only the program rewriting process on the loader program areas has been described. However, it is of course possible to perform the normal program rewriting process, that is, the rewriting process only on the control program.

The above-described example of the present invention is only one of the possible examples within the technical scope of the present invention, and is disclosed as an example of the present invention. Thus, this example is not intended to limit the technical scope of the present invention. In addition, the functional configuration and the physical configuration in the individual example are not limited to the above-described modes. For example, an individual function and physical resource may be integrated and implemented, or may be further divided and implemented. Furthermore, for example, another configuration may be added to part of one configuration, or deletion, replacement, or the like may be performed.

REFERENCE SYMBOL LIST

10 ECU
11 Processor
12 RAM
13 ROM
111 Program rewriting unit
112 Control execution unit
113 Additional program rewriting unit
131 Startup program area
132 First loader program area
133 Second loader program area
134 Control program area

The invention claimed is:
1. A vehicle electronic control device comprising:
a nonvolatile memory in which data is electrically rewritable; and
a processor,
wherein the nonvolatile memory includes:
an activation program area that includes a startup program area which stores a startup program, which is not subject to program rewriting, and a plurality of loader program areas, each of which stores a loader program, which is subject to program rewriting; and
a control program area that stores a control program which controls in-vehicle devices,
wherein, when rewriting the activation program area in program rewriting in response to a program rewriting instruction from an external device, the processor rewrites the loader program in each of the plurality of loader program areas,
wherein, when activating the vehicle electronic control device, the processor executes the loader program stored in a normal one of the plurality of loader program areas by using the startup program and activates the control program by using this loader program executed, and wherein, when the processor activates the vehicle electronic control device, if any one of the plurality of loader program areas is abnormal, the processor sets this abnormal loader program area as an additional rewriting target area and performs an additional rewriting process of rewriting the loader program in the additional rewriting target area with the loader program in the normal loader program area at a predetermined timing.

2. The vehicle electronic control device according to claim 1, wherein, when rewriting the activation program area, the processor rewrites the loader program in one of the plurality of loader program areas and further rewrites, if the rewritten loader program in this loader program area is normal, the loader program in another one of the loader program areas.

3. The vehicle electronic control device according to claim 1, wherein, if the additional rewriting target area is not changed to normal even after performing the additional rewriting process, the processor repeats the additional rewriting process and notifies, if a number of repetitions of the additional rewriting process exceeds a predetermined threshold, an external device that a failure has occurred in the additional rewriting target area.

4. The vehicle electronic control device according to claim 1, wherein the processor calculates a frequency of execution of the additional rewriting process for each of the plurality of loader program areas and outputs, if the frequency of execution of the additional rewriting process performed on a loader program area is higher than a predetermined threshold, a warning to an external device.

5. The vehicle electronic control device according to claim 1, wherein the processor calculates a frequency of execution of the additional rewriting process for each of the plurality of loader program areas and executes, when activating the vehicle electronic control device, the loader program stored in a loader program area among the plurality of loader program areas, the loader program area having a lowest frequency of execution of the additional rewriting process.

6. The vehicle electronic control device according to claim 1, wherein each of the plurality of loader program areas includes a backup area for further storing a loader program, and wherein the processor further stores the loader program stored in each of the plurality of loader program areas in its corresponding backup area.

7. The vehicle electronic control device according to claim 1, wherein the processor performs the program rewriting in response to a program rewriting instruction from an external device only when at least two of the plurality of loader program areas are normal.

8. A program rewriting method, causing a processor of a vehicle electronic control device including a nonvolatile memory in which data is electrically rewritable, the nonvolatile memory including an activation program area that includes a startup program area which stores a startup program, which is not subject to program rewriting, and a plurality of loader program areas, each of which stores a loader program, which is subject to program rewriting, and including a control program area that stores a control program which controls in-vehicle devices, to perform:

rewriting, when rewriting the activation program area in program rewriting in response to a program rewriting instruction from an external device, the loader program in each of the plurality of loader program areas;

executing, when activating the vehicle electronic control device, the loader program stored in a normal one of the plurality of loader program areas by using the startup program;

activating the control program by using this loader program executed, and when activating the vehicle electronic control device, if any one of the plurality of loader program areas is abnormal, setting this abnormal loader program area as an additional rewriting target area and performing an additional rewriting process of rewriting the loader program in the additional rewriting target area with the loader program in the normal loader program area at a predetermined timing.

9. The program rewriting method according to claim 8, wherein, when rewriting the activation program area, the processor rewrites the loader program in one of the plurality of loader program areas and further rewrites, if the rewritten loader program in this loader program area is normal, the loader program in another one of the loader program areas.

10. The program rewriting method according to claim 8, wherein if the additional rewriting target area is not changed to normal even after performing the additional rewriting process, the processor repeats the additional rewriting process and notifies, if a number of repetitions of the additional rewriting process exceeds a predetermined threshold, an external device that a failure has occurred in the additional rewriting target area.

11. The program rewriting method according to claim 8, wherein the processor calculates a frequency of execution of the additional rewriting process for each of the plurality of loader program areas and outputs, if the frequency of execution of the additional rewriting process performed on a loader program area is higher than a predetermined threshold, a warning to an external device.

12. The program rewriting method according to claim 8, wherein the processor calculates a frequency of execution of the additional rewriting process for each of the plurality of loader program areas and executes, when activating the vehicle electronic control device, the loader program stored in a loader program area among the plurality of loader program areas, the loader program area having a lowest frequency of execution of the additional rewriting process.

13. The program rewriting method according to claim 8, wherein each of the plurality of loader program areas includes a backup area for further storing a loader program, and wherein the processor further stores the loader program stored in each of the plurality of loader program areas in the corresponding backup area.

14. The program rewriting method according to claim 8, wherein the processor performs the program rewriting in response to a program rewriting instruction from an external device only when at least two of the plurality of loader program areas are normal.

* * * * *